Sept. 23, 1941.　　　V. E. WHITMAN　　　2,257,081
UNIVERSAL TYPE CAMERA
Filed Oct. 4, 1940　　　7 Sheets-Sheet 1

INVENTOR.
Vernon E. Whitman
BY
Emery, Booth, Townsend, Miller and Weidner
Attys.

Sept. 23, 1941.  V. E. WHITMAN  2,257,081
UNIVERSAL TYPE CAMERA
Filed Oct. 4, 1940  7 Sheets-Sheet 4

INVENTOR.
Vernon E. Whitman,
BY
Attys.

Sept. 23, 1941.  V. E. WHITMAN  2,257,081
UNIVERSAL TYPE CAMERA
Filed Oct. 4, 1940  7 Sheets-Sheet 5
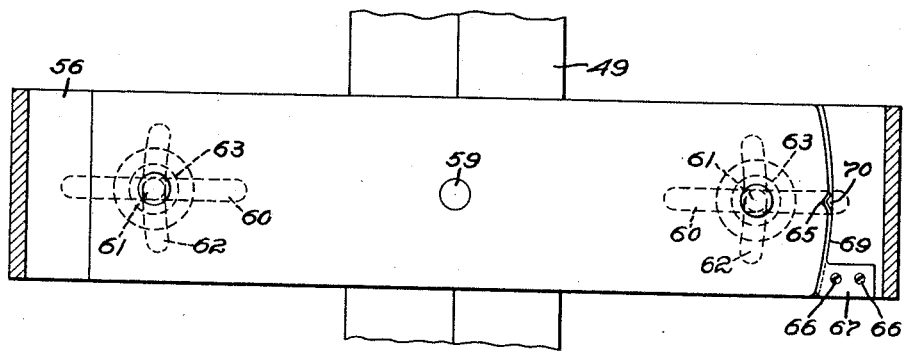
Fig. 7.
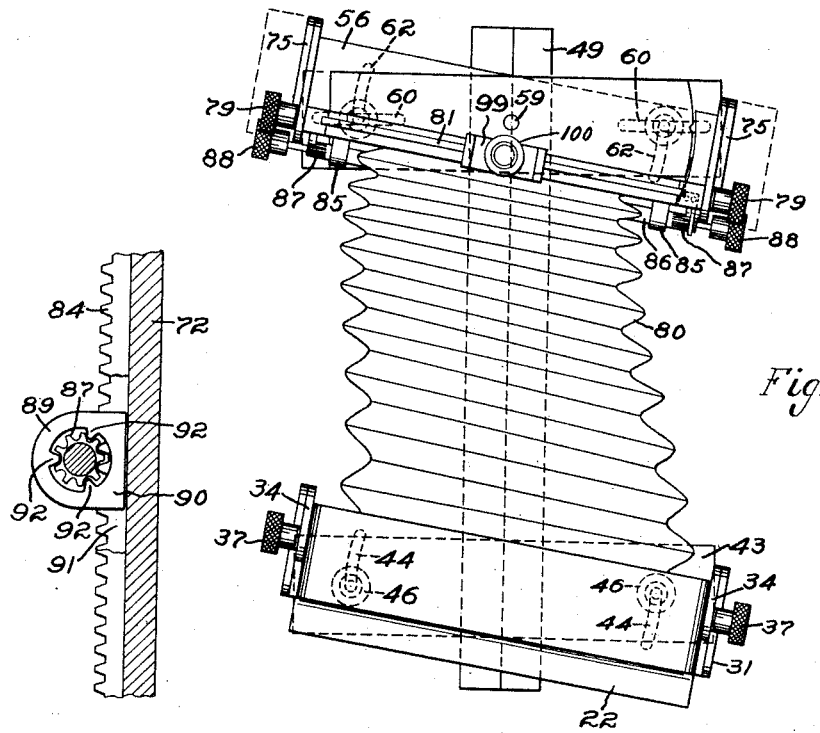
Fig. 8.
Fig. 9.
INVENTOR.
Vernon E. Whitman,
BY
ATTORNEYS.

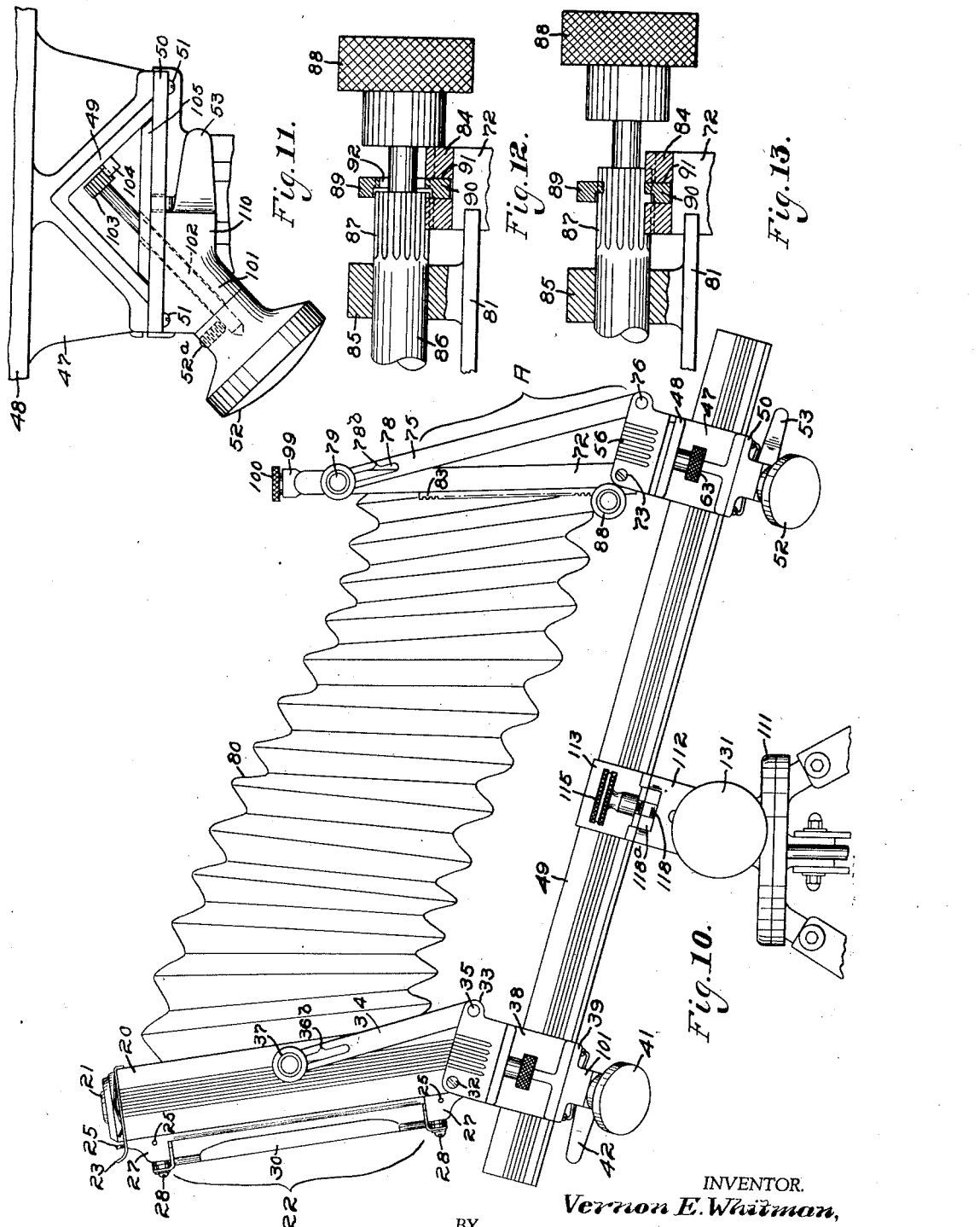

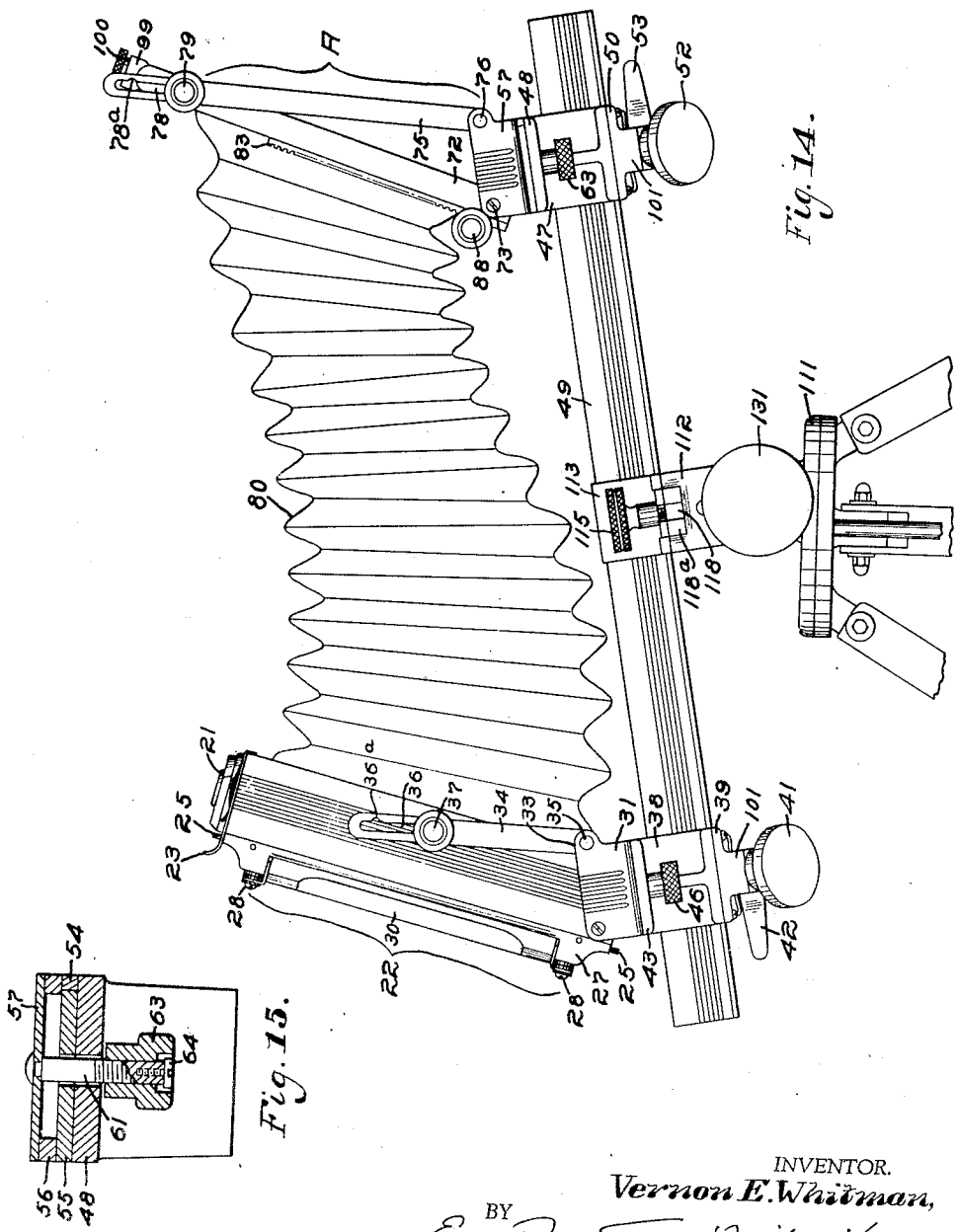

Patented Sept. 23, 1941

2,257,081

UNITED STATES PATENT OFFICE 2,257,081

UNIVERSAL TYPE CAMERA

Vernon E. Whitman, Rochester, N. Y., assignor to The Folmer Graflex Corporation, Rochester, N. Y., a corporation of Delaware Application October 4, 1940, Serial No. 359,708

29 Claims. (Cl. 95—50)

This invention relates to cameras of the so-called universal type, preferably all-metal and adapted to be quickly set up and adjusted to its various positions and securely locked therein.

In order that the principle of the invention may be readily understood, I have disclosed a single embodiment thereof in the accompanying drawings, wherein—

Fig. 7 is a top plan view, partly in section, showing the several adjustments of the camera front;

Fig. 8 is a top plan view of the camera, the camera front and the camera back having been rotated in a clockwise direction, and showing the adjustment of such parts;

Fig. 9 is a fragmentary detail, partly in transverse section, showing the locking means for the camera front board or member adjusting means;

Fig. 10 is a side elevation of the camera with the bed thereof tilted in a clockwise direction, and the camera front and camera back rotated in a contraclockwise direction and locked in place;

Fig. 11 is a fragmentary detail of the camera, showing the focusing knob and its related rack and pinion;

Fig. 12 is a fragmentary detail partially in section, showing the locking means for the camera front-bed adjusting device in unlocked condition;

Fig. 13 is a detail view similar to Fig. 12 but with the camera front-bed adjusting mechanism in locked condition;

Figure 3:
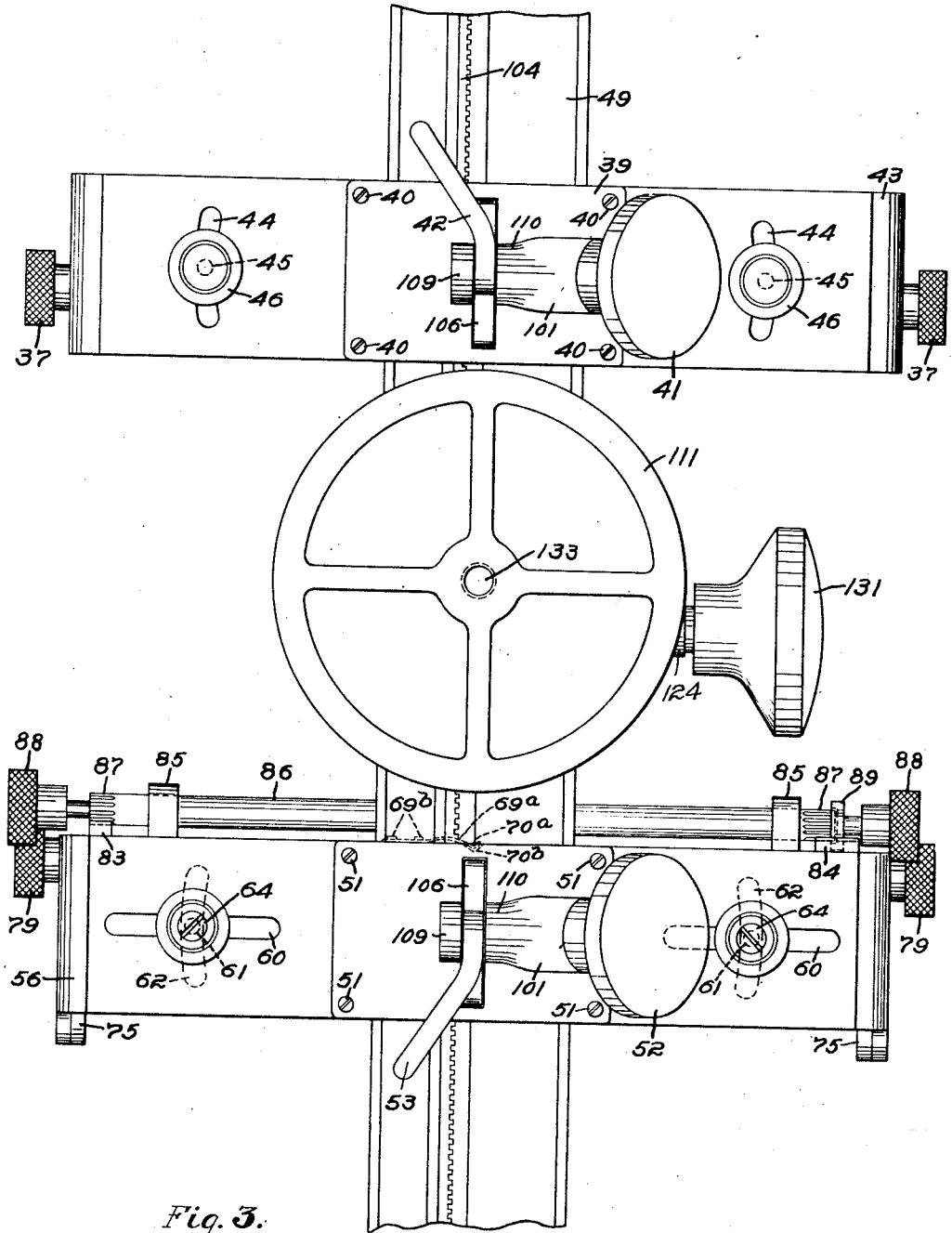
Fig. 3 is a bottom plan view of the camera, showing the position of the camera focusing rack attached to the camera bed and also showing the means for adjusting the camera front and the camera back, the vertical adjustment for the camera front board or member being also shown.

Fig. 14 is a side elevation of the camera, showing the camera bed rotated about the axis of the camera support in a contraclockwise direction, and the camera front and camera back rotated in a clockwise direction, and showing another position of the camera when set up for photographing certain types of objects; and Fig. 15 is a detail in vertical section through Fig. 3, at one of the studs in the retaining plate and the plate member.

The construction herein disclosed and claimed is an improvement upon the construction shown in the co-pending application of Frederick P. Willcox, Ser. No. 333,723, filed May 7, 1940.

Among the objects of this invention are to provide a camera that can quickly be set up and adjusted to its various positions in a minimum amount of time and securely locked into any one of the selected positions; to provide a camera that will be very rigid and exceedingly stable when locked in any one of its adjusted positions, particularly when a large aperture lens is used; to provide a camera that can be manufactured with great precision, although at reasonable cost; to provide a camera support that is readily adjustable so as to provide any bed angle desired with means of locking the support to maintain the position of the bed angle when so adjusted; to provide means for adjusting the camera front in a vertical direction with positive locking means therefor; to provide a camera front that can be rotated about a central axis in either direction and securely locked in any position within the limits of such swing; to provide a camera front with a lateral shift to either side of the central position with means for securely locking the same into any position within the limits of this adjustment; and to provide a focusing adjustment both on the front of the camera and on the rear portion thereof with a simple positive locking means for locking either the front or the back of the camera in any position along the rail of the camera bed.

Figure 1:
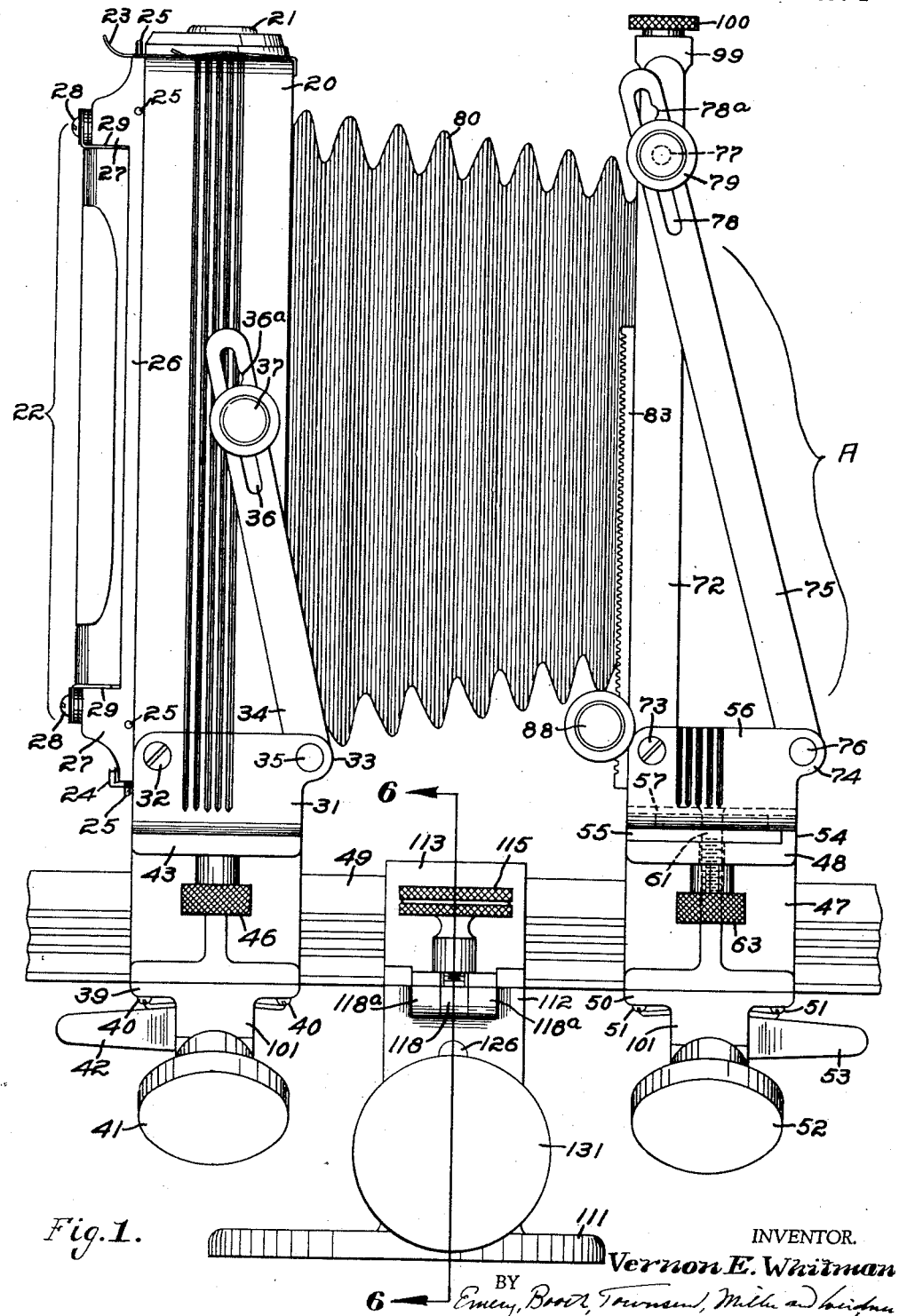
Fig. 1 is a side elevation of the camera with the bellows partly extended, and the camera front and camera back locked in a true vertical position with respect to the camera bed.

Referring first to Figs. 1, 2, 3, 8, 10 and 14 of the drawings, the camera box is indicated at 20, and it has a spirit level 21 attached thereto in any suitable manner, preferably at the upper end thereof. Also attached to the said camera box 20 is a camera back, designated generally at 22, by means of spring clips 23, 23 and 24, 24, themselves attached to the said camera box by screws or by any suitable means. The said camera back 22 is provided with a series of pins 25, 25 for engaging holes (not shown) in the said spring clips 23, 23 and 24, 24. The said camera box 20 and the camera back 22 are of such shape as to permit the camera back 22 to be engaged and supported either in a horizontal position, as shown in Fig. 1, or in a vertical position (not shown). The purpose thereof is to provide means for taking either a horizontally positioned or a vertically positioned picture. The said camera back 22 is made up of a flat plate 26 having integral therewith bolster blocks 27, 27, to which are attached, by screws 28, 28, springs 29, 29 attached to the back focusing panel 30 by means of screws (not shown). This construction provides a spring-loaded focusing panel that is free to move in a rearward direction when a plate holder or a film pack adapter is inserted between said focusing panel 30 and the camera back plate 26, at the same time causing the focusing panel 30 to be thrust into contact with the said flat plate 26 when the sensitized material carrier has been removed, to bring the focusing glass (not shown) in position accurately to register with the focal plane. This structure which is in itself well known in the art needs no further description.

The camera box 20 is provided at its lower part with a transversely extending U-shaped member 31, secured to each end by means of a shoulder screw 32. The said member 31 is also provided at each end with a laterally protruding boss 33 to which bosses are riveted the support arms 34 by means of rivets 35. Each support arm 34 is provided with a lengthwise extending slot 36 of sufficient length and having offsets or notches 36a, 36b engageable by a stud (not shown) in the camera box 20, said stud having attached thereto a lock nut 37. When the nuts 37 are loosened or turned in a contra-clockwise direction, the camera box 20 may be swung about the screws 32 as a pivot within the limits of the slots 36 of the arms 34. Thereupon by tightening the nuts 37, the camera box 20 is held in any preselected position.

The offsets or notches 36 are provided to furnish ready means for establishing the true vertical position of the camera box 20, and they provide ready means for aligning the camera box 20, when swung in a rearward direction with respect to the camera front when the latter is swung in a similar direction.

The U-shaped member 31 is attached to a camera bed saddle 38 by means of screws 40, 40, and a saddle plate 39 carries a focusing knob 41 and a locking lever 42. The said U-shaped member 31 is provided with a central pivot (not shown) about which the said member 31 can be turned. The camera bed saddle 38 is provided with a transversely extending plate 43, most clearly shown in Fig. 3, and which is provided with opposite arcuate slots 44, 44 through which pass studs 45, 45 attached to said U-shaped member 31 and upon which studs 45, 45 are locking nuts 46, 46. When said locking nuts are loosened, the U-shaped member 31 may be turned about a central axis within the limits of said slots 44, 44. The said locking nuts 46, 46 can be tightened to hold the camera box 20 in any desired position within the established limits.

Figure 4:
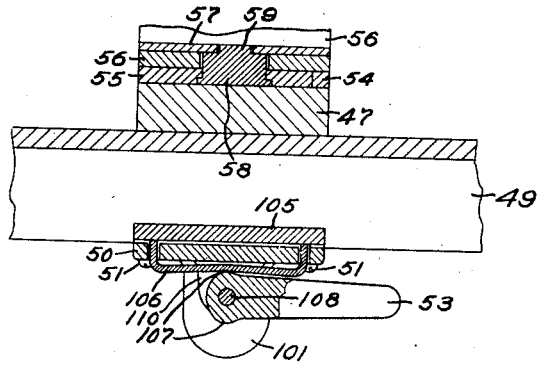
Fig. 4 is a fragmentary vertical cross-section taken through the camera front support, showing the construction of these parts, with the camera front locked to the camera bed.
Figure 5:
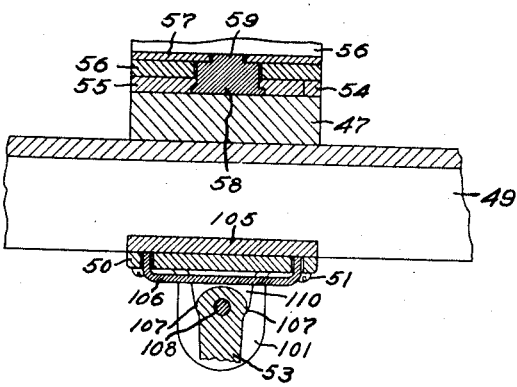
Fig. 5 is a vertical cross section similar to Fig. 4, but with the camera front unlocked from the camera bed, thus permitting adjustment of the camera front with respect to the camera bed.

The camera front, indicated generally at A in Figs. 1, 10 and 14, is also provided with a camera front bed saddle 47 having a transversely extended plate member 48, as shown in the several figures already referred to. The said camera front bed saddle 47 is held to a camera bed 49 by means of a saddle plate 50 itself held to the camera front saddle 47 by screws 51, 51, shown in Figs. 3 and 4. The camera bed 49 is, as shown, a relatively narrow, elongated, metallic member, which may be angular in cross section and is here shown as of an inverted V-shape in cross section. The said saddle plate 50 also carries a front focusing knob 52 and a front focusing locking lever 53. To the said transversely extending plate member 48, as shown best in Figs. 4, 5 and 15, is attached a guide member 54, and overlying said plate member 48 is a pivot plate 55, overlying which latter is a U-shaped front support member 56, itself overlaid in turn by a retaining plate 57. The camera bed 49, which I have herein referred to as a relatively narrow, elongated, metallic member, is a monorail, here shown as a metallic structure of inverted V-shape, which directly receives thereon the saddle 47 for the camera front as well as the saddles yet to be described for the camera back and the head base. As clearly shown in Fig. 2 and elsewhere on the drawings, the saddle 47 has a flat top and directly receives thereon the plate member 48, and the saddle plate 50 is secured by screws to the said saddle 47. This presents an exceedingly simple, compact and rigid structure.

Referring particularly to Figs. 4, 5, 7, 8 and 15, the said pivot plate 55 is provided with an opening through which passes a pivot screw or stud 58, and the said U-shaped front support member 56 is provided with a hole for the passage of said screw or stud, the retaining plate 57 having a hole for the reception of a reduced diameter extension of the pivot screw or stud 58. Said supporting plate member 48 is provided with elongated transversely extending openings 60, 60, most clearly shown in Fig. 3. Riveted to the retaining plate 57 are studs 61, 61 passing through suitable openings in the U-shaped member 56, through arcuate slots 62, 62 in the pivot plate 55 and also through the elongated openings 60, 60 of the transversely extending plate member 48. Upon the lower ends of the studs 61, 61 are locking nuts 63, 63, shown in Figs. 10, 14 and 15, and which are prevented from separation from the studs 61, 61 by retaining screws 64, 64, shown in Figs. 3 and 15.

The structure just described permits a lateral or transverse bodily shift of the camera front A to the position indicated in dotted lines (Fig. 8), either to the right or the left of a central position, this being permitted because of the presence of the slots 60, 60. The said camera front A can be turned about the pivot screw or stud 58 in either direction within the limits of the arcuate slots 62, 62. This latter adjustment can be made after first loosening the locking nuts 63, 63, thus allowing the U-shaped front support member 56 to be shifted sideways or to be turned about the shoulder screw or stud 58 as an axis or pivot. After determining the desired position, the nuts 63, 63 are then tightened so as to clamp the entire assembly securely in place.

In order to facilitate the alignment of the camera front A after it has been positioned about the shoulder screw or stud 58 as an axis, there is provided, as shown in Fig. 7, a notch 65 in the retaining plate 57, and to the U-shaped front member 56 is attached by means of screw 66, 66 a spring 67 provided with a laterally extending arm 69 having a detent 70 for engaging the notch 65 when the camera front A is in the central position. The camera front A is shown as having been swung in a clockwise direction in Fig. 8, but it may be swung in the opposite direction.

In order to align the camera front A in the central position after it has been bodily shifted to the right or to the left as described, I have, as shown in Fig. 3, provided a second spring 69a held to the U-shaped front support member 56 by screws 69b, 69b. The said spring 69a is provided with a detent formation on its free end 70a, and the retaining plate 57 is provided with a notch 70b engaged by the detents 70a when the camera front A is in a central position.

Figure 2:
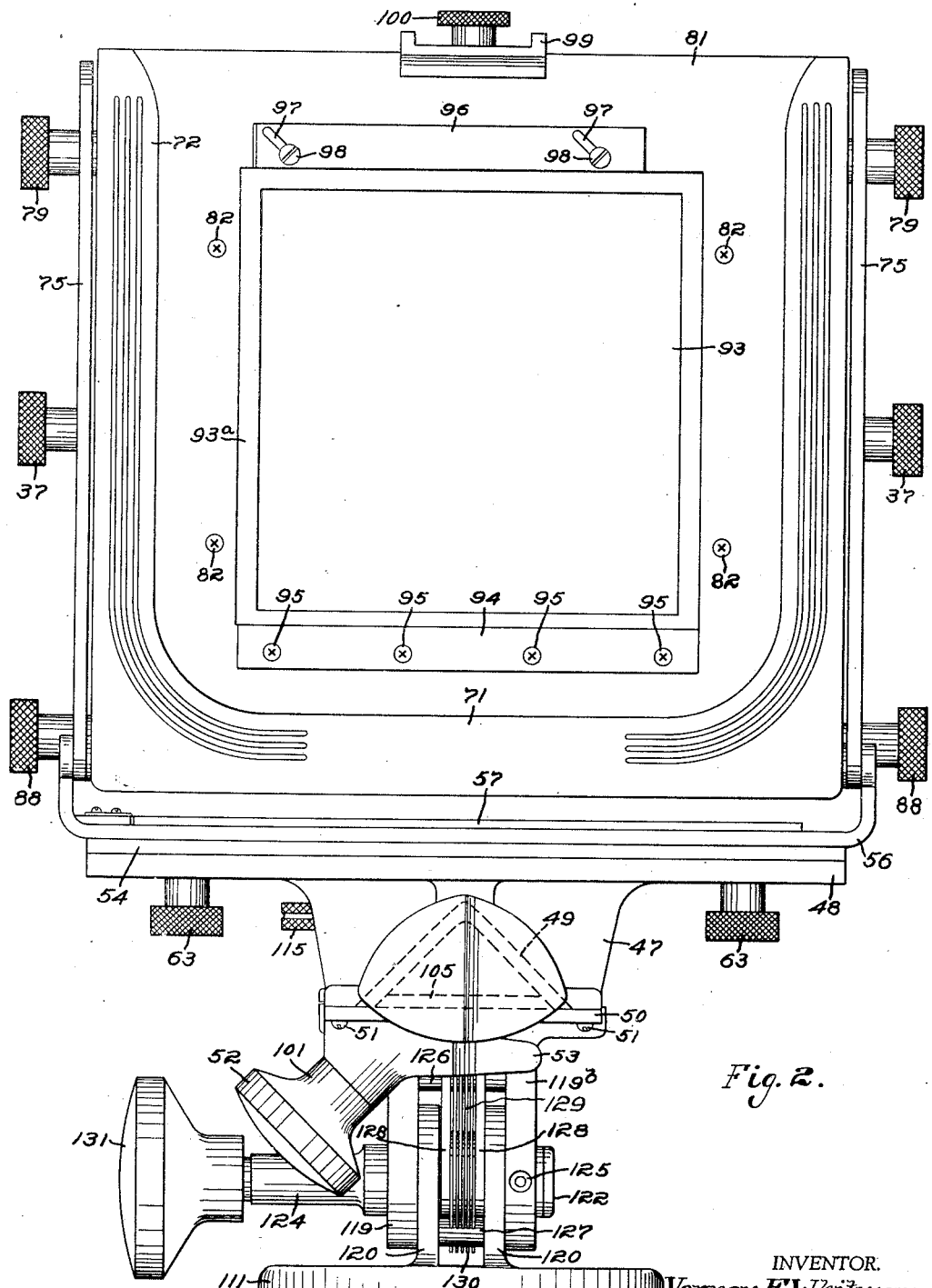
Fig. 2 is a front elevation of the camera, showing the opening for the lens board and showing the adjustable camera support head.

As shown in Figs. 1, 2, 10 and 14, the U-shaped front support member 56 is attached to the camera front board support 71, and has widely spaced vertical side arms 72 (best shown in Fig. 2). Passing through a hole in each end of the U-shaped camera front supporting member 56 and threaded into the camera front board support member 71 is a shoulder screw 73, one of which screws is shown in Fig. 1, and which together allow the camera front board support member 56 to pivot thereon. The said U-shaped camera support member 56 is provided at each end with a protruding boss 74 to which is riveted a front support arm 75 by a shoulder rivet 76. Each of the said arms 75 is held to one of the side arms 72 of the camera front support by means of a stud 77 passing through a lengthwise slot 78 of the corresponding arm 75. Each slot 78 is provided with offsets or notches 78a, 78b. The said offset or notch 78b, shown in Fig. 10, provides ready means for determining the position wherein the camera front A is at right angles to the camera bed 49, and the offset or formation 78a is provided to permit the ready determination of the position of the camera front A with respect to the camera box 20, when said camera box has been swung in a rearward direction and is located by the offsets on notches 36a already described. Threaded onto the studs 77 are clamp nuts 79, 79. It will be apparent that when the nuts 79, 79 are loosened, the camera front A can be rotated about the screws 73 as an axis within the limits of the slots 78 in the arms 75, and when the correct position is found, the clamping nuts 79, 79 can be tightened, thus holding the camera front securely in place.

As shown in said figures, to the camera box 20 is attached a bellows 80 in any suitable manner, said bellows being attached to the camera front board 81 in any suitable manner. However, in the disclosed embodiment of the invention, the bellows 80 is provided with an inner frame (not shown) and is held to the camera front board 81 by means of screws 82, 82, most clearly shown in Fig. 2. The said front board 81 is free to be moved in a vertical direction in slots in the vertical members 72, 72, as shown clearly in Figs. 12 and 13.

To the vertical members 72, 72 of the camera front board member 81, as best shown in Figs. 1, 3, 9, 12, 13 and 14, are attached sections of gear racks 83, 84 by any suitable means such as rivets. The said rack 83 is attached to the left hand side and the rack 84 to the right hand side of the camera, facing the lens. The camera front board 81 has attached thereto, as best shown in Figs. 3, 12 and 13, bearing members or bosses 85, 85, through which passes a shaft 86 on the ends whereof are cut gear teeth 87, 87 meshing with the said racks 83, 84. To the extreme ends of said shaft 86 are attached knobs 88, 88 for the purpose of causing the camera front board 81 to be moved in a vertical direction by turning the knobs 88 in a clockwise direction viewing Fig. 1. During the time the camera front board 81 is being adjusted, the position of the shaft 86 will be that shown in Fig. 12.

I have provided means for locking the camera front board 81 in any position within the limit of the length of rack 83, such means including the rack 84 and a locking plate 89. The said rack 84 is provided with a slot 91 in which rides the said locking plate 89 made as a member semicircular in shape, as best indicated in Fig. 9, and having a protruding boss 90 riding in said slot 91 of the rack 84. The shape and structure of the boss 90 are such as to prevent the locking plate 89 from turning, but at the same time allowing said locking plate 89 to be moved along the lengthwise extending slot 91 of the rack 84. The said locking plate 89 is provided with a counterbore extending partially through the plate and of a sufficiently large diameter to permit the gear teeth 87 to turn therein. The opposite or inner side of the said locking plate 89 is provided with teeth 92, 92 for engaging the gear teeth 87 when the shaft 86 has been moved to the right (facing the front of the camera) as shown in Fig. 12, thus locking the camera front board 81 in any desired position along the rack 84.

As best shown in Fig. 2, the camera front board 81 is provided with an opening 93 having a rabbet 93a to receive a standard lens board held in place on its lower side by means of a strap 94, itself held to the camera front board 81 by means of screws 95, 95, and on its other side held by means of a slide lock 96 having inclined slots 97, 97 through which pass shoulder screws 98, 98, holding the said slide lock 96 in place. This just referred to structure is well known and requires no further description.

Also attached to the camera front board 81 is a channel member 99 having a stud onto which is threaded a clamp nut 100, the purpose of such structure being to provide ready means for attaching lens shade, filter holders, etc. to the front of the camera.

Referring to Figs. 10, 11 and 14, the camera front A and the camera box or rear section 20 are caused to be moved along the camera bed 49 by means of rack and pinion mechanism. In Fig. 11 is shown the mechanism for accomplishing such adjustment of the camera front A. The mechanism for causing the camera box or rear section 20 of the camera to be moved along the camera bed 49 is preferably of similar construction.

The saddle plate 50 is provided with a hub or boss 101 through which passes a shaft 102 having fast on the outer end a pinion 103 meshing with rack 104 secured to the inner wall of the camera bed 49 in any well known manner as by rivets. On the opposite end of shaft 102 the focusing knob 52 is secured by means of a set screw 52a.

In order to clamp the camera support saddle 47 to the camera bed 49, there is provided a plate 105, best shown in Figs. 4, 5 and 11, which is caused to be moved upwardly by means of a flattened U-shaped spring 106 overlying a cam formation 107 on the locking lever 53 pivoted on a pin 108 passing through said lever 53 and through suitably supported brackets 109, 110. When said locking lever 53 is turned in a contraclockwise direction, as viewed in Fig. 4, said spring 106 is thrust upwardly against plate 105, which is thereby clamped against the inner surface of the camera bed 49. When said locking lever 53 is swung downwardly as indicated in Fig. 5, said spring 106 is permitted to move downwardly, whereupon plate 105 moves from contact with the walls of the camera bed 49, thus unlocking the camera support saddle 47, so that it can be moved along the camera bed 49 by the means described.

In order to obtain full advantage of the adjustment herein provided, it is necessary to provide in and for cooperation therewith a tilting and rotating head, the structure whereof is best shown in Figs. 1 to 4 and 6.

Figure 6:
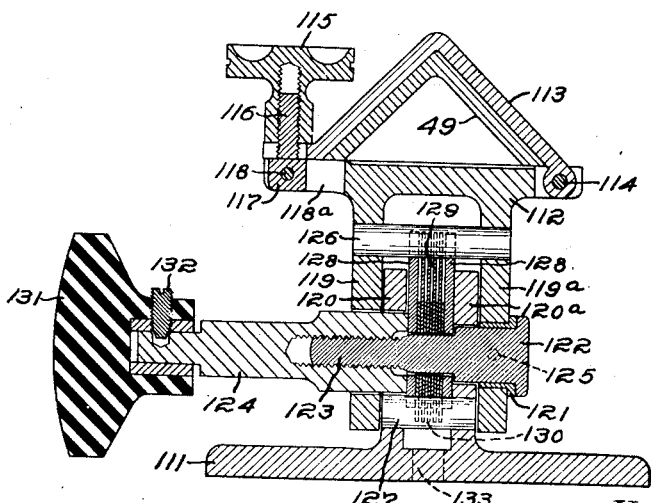
Fig. 6 is a vertical cross section taken through the adjustable camera support head, on the line 6—6 of Fig. 1, and showing the means for attaching the camera bed to the camera head.

In Figs. 2, 4 and 6, a head base is shown at 111, as hinged to a vertical support 112 above it, and hinged to said vertical support 112 is a clamping saddle 113 by means of a horizontal pin 114, most clearly shown in Fig. 6. The said saddle 113 is positioned over the camera bed 49 and is clamped and held securely in place by a clamping nut 115. As shown in Fig. 6, said clamping nut 115 is threaded on an upright stud 116 having an enlarged boss 117 through which passes a transversely extending pin 118, said pin also extending through bosses 118a, 118a on the said vertical support 112. By loosening nut 115 the stud 116 can be swung to the left viewing Fig. 6, thus permitting the clamping saddle 113 to be swung to the right, so permitting the removal of the camera bed 49 from the camera vertical support 112. By slightly loosening the nut 115, said camera bed 49 may be moved lengthwise through the clamping saddle 113 to any desired position and then clamped thereat.

The vertical support 112 is provided with two spaced vertical arms or hinge members 119, 119a. The said head base plate 111 is provided with two spaced vertical bosses or hinge members 120, 120a. Extending through a hole in the said hinge member 119a is a bushing 121, and extending through such bushing is a shoulder stud or screw 122 having a threaded extension 123 onto which is screwed an internally threaded shaft 124. The said shoulder stud or screw 122 and the bushing 121 are held securely to the hinge member 119a by a pin 125. The said shoulder stud or screw 122 also passes through a hole in the hinge member 120a of the base plate 111. The internally threaded shaft 124 also passes through a hole in the vertical arm or hinge member 119, and through hinge member 120 of the base plate 111. Through suitable holes in the vertical arm or hinge members 119, 119a passes an unthreaded pin 126, and through suitable holes in the bosses or hinge members 120 and 120a of the base plate 111 passes an unthreaded pin 127. Placed over the shoulder stud or screw 122 are metal disks 128, 128 of rather heavy or thick cross section. Also placed over the shoulder stud or screw 122 is a series of disks 129 of very much lighter or thinner cross section. The said disks 128 and 129 are engaged by pin 126, and are caused to move with the vertical support member 112 when that is moved. Placed alternately between the disks 129 and over the shoulder stud or screw 122 is a series of disks 130, the opposite ends of which are engaged by a pin 127.

The structure just described forms a clutch or clamping means operating as follows. To the end of the internally threaded shaft 124 is attached a tightening knob 131 by means of a locking screw 132. When said knob 131 is turned in a contraclockwise direction viewing Fig. 1, the pressure on disks 128, 129 and 130 is released, thus permitting the vertical support 112 to be rotated about the axis of the stud or shoulder screw 122 and the internally threaded shaft 124, to any position between vertical and horizontal. When the tightening knob 131 is turned in a clockwise direction, the internally threaded shaft 124 is caused to be advanced on the boss 123 of the shoulder stud or screw 122, thus causing all of the clutch disks to be clamped together, inasmuch as part of the clutch disks are locked by the pin 126 to the vertical support member 112 and the remainder of the clutch disks are locked by pin 127 to hinge members 120, 121 of the base 111. The vertical support 112 will thus be clamped securely to the base plate 111.

The camera may be swung around in a horizontal direction merely by loosening the tripod clamping screw (not shown) which is engaged in the threaded hole 133, shown in full lines in Fig. 3 and in dotted lines in Fig. 6.

From the foregoing description of the preferred embodiment of the invention, it will be apparent that the camera box 20 can be mounted similarly to the camera front A—that is to say, so as to have a lateral shift as well as a horizontal swing, such construction being desirable for some types of work. It may be desirable to eliminate the lateral shift from the camera front A and construct it as described with respect to the camera back 20, for reasons of economy.

The camera herein disclosed fills the needs or requirements of many types of photography wherein is required a high precision camera having all the adjustments of the large cumbersome universal cameras.

Having thus described one illustrative embodiment of the invention, it is to be understood that although specific terms are employed, they are used in a generic and descriptive sense, and not for purposes of limitation, the scope of the invention being set forth in the following claims.

I claim

1. A universal-type camera structure including in combination, an elongated, monorail, camera bed, a camera back or box member and a camera front member, each separately received upon and having means whereby they are adjustably secured to said camera bed and having a bellows connection, means for supporting one of said members on the monorail camera bed so that it may be swung in directions transverse to the lengthwise dimension of the said monorail camera bed while secured thereto and means for effecting the bodily lateral shifting of said one member with respect to said camera bed while secured thereto, said means for effecting said swinging and bodily shifting including a supporting member having at opposite portions thereof arcuate slots and also slots at substantially right angles thereto for the reception of securing studs.

2. Means for supporting a camera member on a camera bed so that it may be swung in directions transverse to the lengthwise dimension of the camera bed, and means permitting the bodily lateral shifting of said member with respect to said camera bed, said means permitting said swinging and bodily shifting including a supporting member having at opposite portions thereof arcuate slots and also slots at substantially right angles thereto for the reception of securing studs, together with means for aligning the said laterally shiftable member in central position when returned from its laterally shifted position.

3. A universal-type camera structure including in combination, an elongated, monorail, camera bed, a camera back or box member and a camera front member, each separately received upon and having means whereby they are adjustably secured to said camera bed and having a bellows connection, and means for effecting both a swinging movement upon an upright axis and a bodily, laterally shifting movement of the said camera front member with respect to and while secured to said monorail camera bed, said means including the saddle secured to said monorail camera bed, a transversely extending plate member 48 supported by said saddle, a pivot plate 55 overlying the said plate member and a front support member 56 overlying said pivot plate, a pivot stud 58 received in said plate 55 and member 56, said supporting plate member 48 having elongated, transversely extending slots 60, 60 and arcuate slots 62, 62 at substantially right angles thereto, and securing studs 61, 61 received in said slots.

4. A universal-type camera structure including in combination, an elongated, monorail, camera bed, a camera back or box member and a camera front member, each separately received upon and having means whereby they are adjustably secured to said camera bed and having a bellows connection, and means for effecting both a swinging movement upon an upright axis and a bodily, laterally shifting movement of the camera front member with respect to and while secured to said monorail camera bed, said means including the saddle secured to said monorail camera bed, a supporting plate member secured flatwise to said saddle and having transversely extending slots 60, 60, and means providing arcuate slots 62, 62 at substantially right angles thereto, and means carrying retaining studs 61, 61 received in said slots.

5. A universal-type camera structure including in combination, an elongated, monorail, camera bed, a camera back or box member and a camera front member, each separately received upon and having means whereby they are adjustably secured to said camera bed and having a bellows connection, and means for effecting both a swinging movement upon an upright axis and a bodily, laterally shifting movement of the camera front member with respect to and while secured to said camera bed, said means including the saddle secured to said monorail camera bed, a plate member pivotally supported upon an upright axis in flatwise proximity to said saddle, and having at opposite ends a pair of intersecting slots for the reception of retaining studs for securing the camera front member in the position to which it may be swung, and means supported upon said saddle and carrying said studs.

6. A universal-type camera structure including in combination, an elongated, monorail, camera bed, a camera back or box member and a camera front member, each separately received upon and having means whereby they are adjustably secured to said camera bed and having a bellows connection, said securing means including a saddle on said camera bed and to which said camera front member is attached, said camera front member having a front board member adjustable up and down while the front member is attached to said saddle, and means for effecting such adjustment and for locking the parts in adjusted position including opposite racks 83, 84, a shaft 86 engaging said racks, and a locking plate 89 supported in one of said racks and through which said shaft extends.

7. A universal-type camera structure including in combination, an elongated, monorail, camera bed, a camera back or box member and a camera front member, each separately received upon and having means whereby they are adjustably secured to said camera bed and having a bellows connection, said securing means including a saddle on said camera bed and to which said camera front member is attached, said camera front member having a front board member adjustable up and down while the front member is attached to said saddle, and means for effecting such adjustment including oppositely positioned racks 83, 84, a lengthwise movable shaft 86 engaging both of said racks, and a locking plate 89 receivable in one of said racks and into locking engagement with which teeth of said shaft may be moved.

8. A universal-type camera structure including in combination, an elongated, monorail, camera bed, a camera back or box member and a camera front member, each separately received upon and having means whereby they are adjustably secured to said camera bed and having a bellows connection, said securing means including a saddle on said camera bed and to which said camera front member is attached, said camera front member having a front board member adjustable up and down while the front member is attached to said saddle, and means for effecting such up and down adjustment including upright racks 83, 84, a lengthwise movable shaft engaging therewith and a locking plate 89 supported in one of said racks and having locking formations with which teeth of said shaft may be engaged.

9. A universal-type camera structure including in combination, an elongated, monorail, camera bed, a camera back or box member and a camera front member, each separately received upon and having means whereby they are adjustably secured to said camera bed and having a bellows connection, said securing means including a saddle on said camera bed and to which said camera front member is attached, the said means for adjustably securing at least one of said members in adjusted position upon said camera bed, including a supporting saddle received upon one face of the said monorail camera bed, a plate engaged with the opposite face thereof, and means for moving said plate into clamping relation with the said monorail camera bed including a spring plate engaging said first mentioned plate, and a movable clamping member to engage said spring plate and thereby to force the first mentioned plate into clamping relation to the said monorail camera bed.

10. A universal-type camera structure including in combination, an elongated, monorail, camera bed, a camera back or box member and a camera front member, each separately received upon and having means whereby they are adjustably secured to said camera bed and having a bellows connection, said securing means including a saddle on said camera bed and to which said camera front member is attached, the said means for adjustably securing at least one of said members in adjusted position upon said camera bed, including a camera support saddle 41 engaging one face of said monorail camera bed, a plate 105 engaging the opposite face of said bed, a spring plate 106 engaging said first mentioned plate to move the same, and manually movable locking means having a formation to engage said spring plate, thereby to cause the latter to force the first mentioned plate into clamping relation to the said monorail camera bed.

11. A universal-type camera structure including in combination, an elongated, monorail, camera bed, a camera back or box member and a camera front member, each separately received upon and having means whereby they are adjustably secured to said camera bed and having a bellows connection, said securing means including a saddle on said camera bed and to which said camera front member is attached, the said means for adjustably securing at least one of said members in adjusted position upon said monorail camera bed, including a front bed saddle 47 engaging one face of the camera bed, a plate 105 engaging the opposite face thereof, a U-shaped spring 106 engaging said plate 105, and a locking lever 53 having a cam formation to engage said spring plate to cause it to move the first mentioned plate into clamping relation with the said monorail camera bed.

12. A universal-type camera structure including in combination, an elongated, monorail, camera bed, a camera back or box member and a camera front member, each separately received upon and having means whereby they are adjustably secured to said camera bed and having a bellows connection, said securing means including a saddle on said camera bed and to which said camera front member is attached, a camera bed support having means to clamp the same to said camera bed and having depending spaced hinged members, a head base plate having upstanding spaced hinge members to cooperate with the first mentioned hinge members, and means for permitting relative swinging movement of said several hinge members, and for securing them, and therefore the camera bed, in the desired position of adjustment, including interengaging screw threaded members extending transversely through said several hinge members, unthreaded pins respectively received transversely in said several hinge members and two sets of disks received upon said screw threaded members, and engaged by said unthreaded pins respectively, and constituting clutching means.

13. A construction according to claim 12, in which tightening means is provided upon one of said interengaging screw threaded members and adapted by opposite movements of rotation to clamp and unclamp the parts.

14. A construction according to claim 12, in which the said interengaging screw threaded members are an externally threaded screw 122 and an internally threaded shaft 124 receivable thereon.

15. A universal-type camera structure including in combination, an elongated, monorail, camera bed, a camera back or box member and a camera front member, each separately received upon and having means whereby they are adjustably secured to said camera bed and having a bellows connection, said securing means including a saddle on said camera bed and to which said camera front member is attached, and a camera bed support having means to clamp the same to said camera bed, said clamping means including a clamping saddle 113, a support 112 to which said clamping saddle is pivoted, and a movable stud 116 upon said support and having a clamping nut 115 received thereon.

16. A construction according to claim 15, in which the said support is provided with spaced depending hinge members, a head base plate having upstanding spaced hinge members, disks receivable between said several hinge members, and means extending transversely through said hinge members to clutch said disks together in any desired angular position of said support.

17. A structure according to claim 2, but in which the camera bed is a monorail and a saddle is supported thereon and is adjustable lengthwise said monorail, and the said camera member is supported above but in close proximity to said saddle.

18. A structure according to claim 2, but in which the camera bed is a monorail of angular cross section and a saddle is clamped directly on the said monorail for adjustment therealong, and a flat plate is supported upon the upper face of the saddle and the said camera member is supported above and in close proximity to said plate.

19. A structure according to claim 2, but in which the camera bed is a monorail of inverted triangular shape in cross section and a correspondingly shaped saddle is clamped onto said monorail with capacity for adjustment therealong, the said saddle having a flat upper face, and a transversely extending plate is secured to said flat face of said saddle and having a broadened U-shaped camera member support which is supported directly above said saddle, to receive said camera member.

20. A structure according to claim 2, but in which the camera bed is a monorail of inverted triangular shape in cross section and a correspondingly shaped saddle is clamped onto said monorail with capacity for adjustment therealong, the said saddle having a flat upper face and a transversely extending plate is secured to said flat face of said saddle and having a broadened U-shaped camera member support which is supported directly above said saddle to receive said camera member, said broadened U-shaped member being connected by an upright pivot from said saddle structure to permit the turning movement of said camera member.

21. A camera including a camera bed of monorail construction, means for supporting a camera member on said bed so that it may be swung in directions transverse to the lengthwise dimension of the camera bed, and means permitting the bodily lateral shifting of said camera member with respect to said camera bed, said means permitting said swinging and bodily shifting including a supporting member having at opposite portions thereof arcuate slots and also slots at substantially right angles thereto for the reception of securing studs, together with means for aligning the said laterally shiftable member in central position when returned from its laterally shifted position.

22. Means for supporting a camera front member on a monorail camera bed, means for effecting both a swinging movement upon an upright axis and a bodily, laterally shifting movement of the said camera front member with respect to and while secured to said monorail camera bed, said means including a saddle secured to said monorail camera bed, a transversely extending plate member 48 supported by said saddle, a pivot plate 55 overlying the said plate member and a front support member 56 overlying said pivot plate, a pivot stud 58 received in said plate 55 and member 56, said supporting plate member 48 having elongated, transversely extending slots 60, 60 and arcuate slots 62, 62 at substantially right angles thereto, and securing studs 61, 61 received in said slots.

23. A camera-member assembly supportable as a unit on a monorail camera bed, including the following parts: a saddle having a substantially flat top and receivable directly upon the upper face of such monorail camera bed; a plate receivable against the lower face of said camera bed opposite said saddle; means to hold said saddle and plate tightly against said camera bed; a flat plate secured upon the upper face of said saddle, and adapted, with the parts assembled, to extend transversely to the lengthwise axis of the said camera bed; a front support member of broadened U-shape having its base supported flatwise with respect to said flat plate above said saddle and closely adjacent thereto; means providing an upright pivot for said front support member; said front support member and said flat plate above the saddle having cooperating means for effecting both a turning adjustment of said front support member upon said upright pivot and also a bodily lateral shifting of said front support member; spaced upright side arms pivotally supported upon said front support member; and a camera front board supported by said side arms.

24. A camera-member assembly according to claim 23, but in which the means to hold the saddle and plate against the camera bed consists of clamping means by which said camera-member may be adjusted to and fro along said camera bed.

25. A camera-member assembly according to claim 23, but in which a pivot plate is provided that is received flatwise above and close to said saddle, and which has an upright pivot pin, thereby providing the said upright pivot for the front support member.

26. A camera-member assembly according to claim 23, but in which means is provided to adjust the camera front board up and down between said side arms.

27. A camera-member assembly according to claim 23, but in which the camera-bed-engaging face of the saddle is of inverted V shape to fit onto a monorail camera bed of corresponding shape.

28. A camera-member assembly according to claim 23, but in which the means for effecting both a turning adjustment and a bodily lateral shifting of the front support member consists of arcuate slots and slots at substantially right angles thereto, and securing studs received in said slots.

29. A camera-member assembly supportable as a unit on a monorail camera bed, including the following parts: a saddle having a substantially flat top and receivable directly upon the upper face of such monorail camera bed; a plate receivable against the lower face of said camera bed opposite said saddle; means to hold said saddle and plate tightly against said camera bed; a flat plate secured upon the upper face of said saddle and adapted, with the parts assembled, to extend transversely to the lengthwise axis of the said camera bed; a front support member of broadened U-shape having its base supported flatwise with respect to said flat plate above said saddle and closely adjacent thereto; means providing an upright pivot for said front support member; said front support member and said flat plate above the saddle having cooperating means for effecting both a turning adjustment of said front support member upon said upright pivot and also a bodily lateral shifting of said front support member; and spaced upright side arms pivotally supported upon said front support member.

VERNON E. WHITMAN.